J. E. DILGER.
STEERING GEAR ATTACHMENT.
APPLICATION FILED MAR. 1, 1915.

1,251,875. Patented Jan. 1, 1918.

Witnesses
Inventor
J. E. Dilger
By C. L. Parker, Attorney

UNITED STATES PATENT OFFICE.

JOHN E. DILGER, OF YANKTON, SOUTH DAKOTA.

STEERING-GEAR ATTACHMENT.

1,251,875.  Specification of Letters Patent.  Patented Jan. 1, 1918.

Application filed March 1, 1915. Serial No. 11,309.

*To all whom it may concern:*

Be it known that I, JOHN E. DILGER, a citizen of the United States, residing at Yankton, in the county of Yankton and State of South Dakota, have invented certain new and useful Improvements in Steering-Gear Attachments, of which the following is a specification.

My invention relates to improvements in safety appliances for connection with the steering means of automobiles or the like, for maintaining the front steering wheels normally parallel with the longitudinal axis of the machine, and at the same time allowing of the steering wheels being turned by the steering gear, as is customary.

An important object of the invention is to provide means of the above mentioned character, which are highly practical, simple in construction, inexpensive to manufacture, and may be used in connection with the steering means of the ordinary automobile, without altering the construction of the steering means.

Other objects and advantages of the invention will be apparent during the course of the following description.

Figure 1:
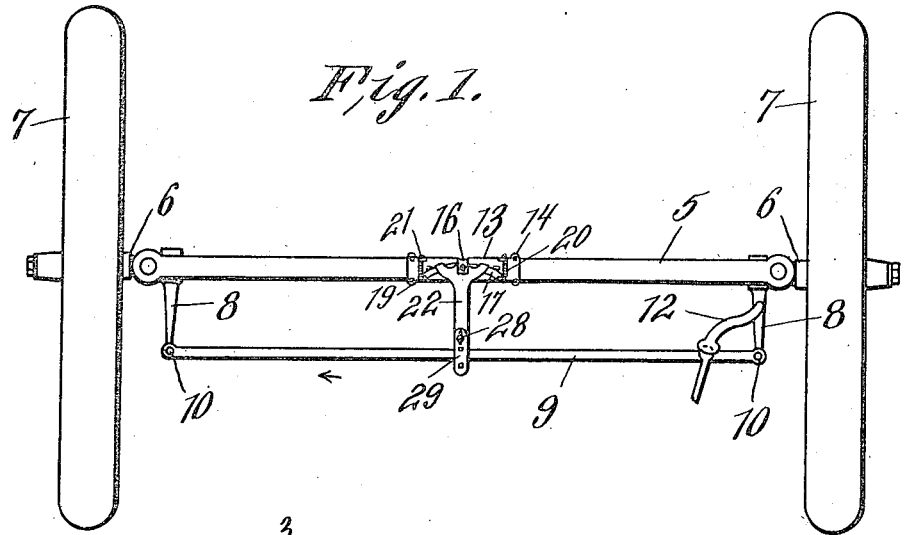
Figures 2, 3, 4:
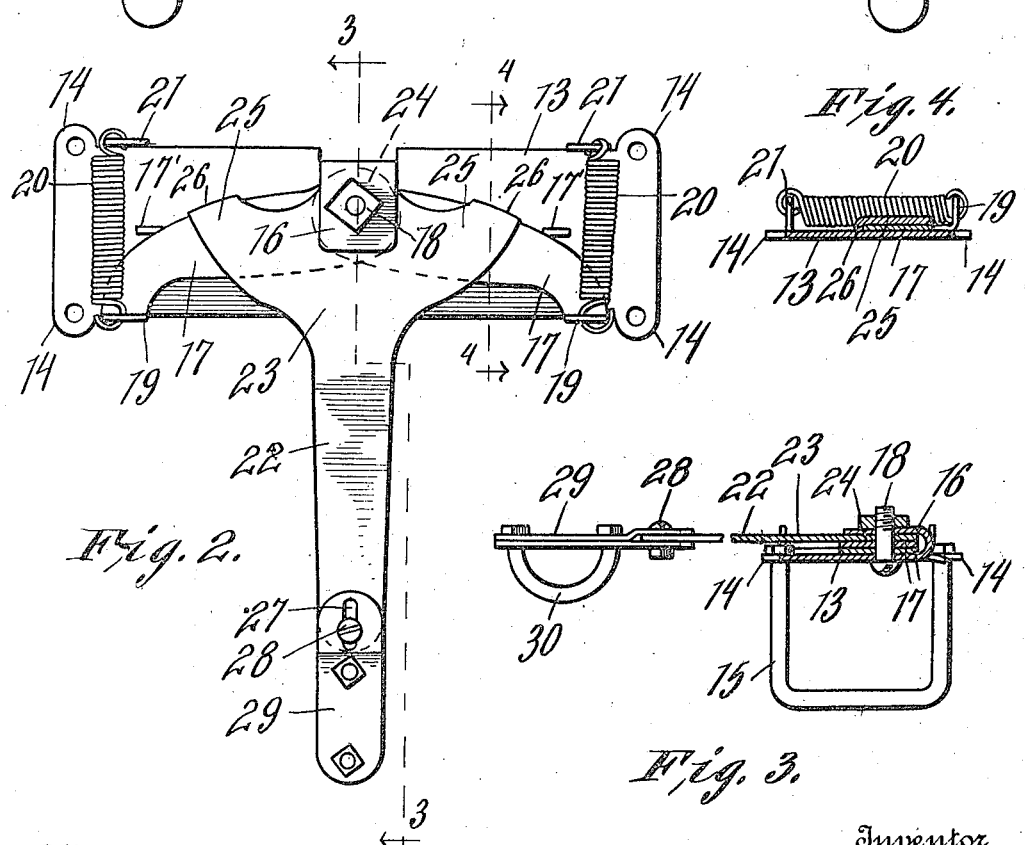

In the accompanying drawings forming a part of this specification and in which like numerals are employed to designate like parts throughout the same, Figure 1 is a plan view of apparatus embodying my invention, showing the same applied to the steering means of an automobile, Fig. 2 is an enlarged plan view of apparatus removed, Fig. 3 is a longitudinal sectional view taken on line 3—3 of Fig. 2, and, Fig. 4 is a transverse section taken on line 4—4 of Fig. 2.

In the drawings, wherein for the purpose of illustration is shown a preferred embodiment of my invention, the numeral 5 designates the front axle of an automobile or vehicle, to the ends of which are pivoted knuckles 6, as is customary. These knuckles have the front steering wheels 7 rotatably mounted thereon. The knuckles 6 are swung in a horizontal plane by means of laterally extending arms 8, rigidly secured thereto. The numeral 9 designates a connecting rod or drag link, pivotally connected with the arms 8, as shown at 10. The arms 8 are simultaneously swung by an arm 12, rigidly connected with one arm 8, by any suitable means. The arm 12 is moved by the usual steering gear (not shown) embodying the hand wheel.

My appliance or apparatus comprises a body portion or plate 13, preferably arranged upon the top of the axle 5 and provided at its ends with apertured ears 14, receiving U-shaped clamp bolts 15, encircling the axle. Any other suitable means may be employed to rigidly connect the body portion or plate with the front axle. This body portion or plate is preferably formed of plate or sheet metal and is provided centrally thereof with a transverse tongue 16, arranged above the plate 13 and spaced therefrom, as shown.

Preferably disposed upon the upper side of the plate 13 are arms 17, extending longitudinally thereof and engaging with stationary stops 17', fixed upon the plate 13. These arms have their inner ends apertured for receiving a bolt or pivot element 18, passing through apertures in the plate 13 and the tongue 16, as more clearly shown in Fig. 3. The arms 17 are preferably longitudinally curved and are provided at their ends with apertured ears or extensions 19, for connection with the hooked ends of suitably stiff retractile coil springs 20, as shown. These springs 20 extend transversely of the plate 13 and have their opposite hooked ends attached to apertured ears 21, carried by the plate 13 and preferably integral therewith, as shown.

The numeral 22 designates an operating arm provided at one end with an enlarged portion or head 23, having an apertured forward portion 24, disposed between the tongue 16 and arms 17, with the pivot element 18 passing through its aperture, whereby the operating lever 22 is pivotally connected with the body portion 13. The head 23 comprises laterally extending portions or arms 25, the ends of which are bent laterally or downwardly, providing flanges or elements 26, engaging with the edges of the arms 17.

At its rear end the operating arm 22 is preferably provided with an aperture 27 receiving a pivot element or bolt 28, passing through a slot or slots 27 in the forward end of an attaching link 29, as shown. This attaching link is preferably arranged upon the upper side of the connecting or drag rod or link 9, and is provided with apertures for receiving a clamping U-bolt 30, encircling the same to rigidly attach the link 29 thereto.

In operation, when the operating arm 22 is in the normal position parallel with the longitudinal axis of the automobile, the arms 17 are held by the springs 20 in engagement with the stops 17'. The operating arm 22 holds the connecting rod or drag link 9 in the normal position for retaining the wheels 7 parallel with the longitudinal axis of the automobile. It is thus apparent that should the steering gear embodying the arm 12 break or become otherwise inoperative, the automobile would continue in its straight line of travel. Of course the steering gear may be operated for laterally turning the wheels 7 in either direction. Upon this movement of the wheels 7 the rod or drag link 9 will move longitudinally in either direction, swinging the operating arm 22 laterally. If it be assumed that the connecting rod 9 moves to the left as indicated by the arrow, the operating arm 22 will swing the right hand arm 17 to the left, while the opposite arm 17 remains stationary. It is thus apparent that the operating arm 22 moves the arms 17 independently of each other.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. A steering gear attachment, comprising a body portion adapted to be secured to the axle of a vehicle, a pair of independently movable arms extending longitudinally of the body portion with their inner ends arranged near each other and pivotally connected with the body portion, an operating arm extending transversely of the body portion and having one end arranged near the inner ends of said arms and pivotally connected with the body portion and carrying lateral extensions engaging said arms, yielding elements opposing the movement of said arms in one direction, and means pivotally connecting the free end of the operating arm with a connecting rod or drag link.

2. A steering gear attachment, comprising a body portion adapted to be secured to the axle of a vehicle, a pair of independently movable arms extending longitudinally of the body portion with their inner ends arranged adjacent each other, an operating arm having one end arranged adjacent the inner ends of said arms and provided with lateral extensions engaging said arms, a common pivot element connecting all of the arms with the body portion, and means pivotally connecting the operating arm with a connecting rod or drag link.

In testimony whereof I affix my signature in presence of two witnesses.

JOHN E. DILGER.

Witnesses:
 EDWARD M. DOYLE,
 JOSEPH JANOUSEK.

Copies of this patent may be obtained for five cents each, by addressing the "Commissioner of Patents, Washington, D. C."